US012651980B2

(12) United States Patent
Serrano et al.

(10) Patent No.: US 12,651,980 B2
(45) Date of Patent: Jun. 9, 2026

(54) METHODS AND DEVICES FOR CALIBRATING CAPACITIVE RESONATORS

(71) Applicant: Panasonic Intellectual Property Management Co., Ltd., Kadoma (JP)

(72) Inventors: Diego Serrano, Alpharetta, GA (US); Ronald Lipka, Northborough, MA (US); Evgueni Ivanov, Lexington, MA (US); Daniel Sullivan, Clinton, MA (US)

(73) Assignee: Panasonic Intellectual Property Management Co., Ltd., Kadoma (JP)

( * ) Notice: Subject to any disclaimer, the term of this patent is extended or adjusted under 35 U.S.C. 154(b) by 196 days.

(21) Appl. No.: 18/833,016

(22) PCT Filed: Jan. 11, 2023

(86) PCT No.: PCT/JP2023/000427
§ 371 (c)(1),
(2) Date: Jul. 25, 2024

(87) PCT Pub. No.: WO2023/145430
PCT Pub. Date: Aug. 3, 2023

(65) Prior Publication Data
US 2025/0150005 A1 May 8, 2025

Related U.S. Application Data

(60) Provisional application No. 63/267,241, filed on Jan. 28, 2022.

(51) Int. Cl.
*H02N 1/00* (2006.01)

(52) U.S. Cl.
CPC .................................. *H02N 1/002* (2013.01)

(58) Field of Classification Search
CPC .. H02N 1/002; G01C 25/005; G01C 19/5684; H02M 3/003; H02M 3/015; H02M 3/073
(Continued)

(56) References Cited

U.S. PATENT DOCUMENTS 7,543,496 B2 * 6/2009 Ayazi ................. G01C 19/5698
73/504.12
8,166,816 B2 5/2012 Ayazi et al.
(Continued)

FOREIGN PATENT DOCUMENTS

CN 107482904 A 12/2017
WO 2011/124576 A1 10/2011
WO 2012/078520 A1 6/2012

*Primary Examiner* — Ahmed Elnakib
(74) *Attorney, Agent, or Firm* — McDonald Hopkins LLC

(57) ABSTRACT

A method of calibrating a resonator having a resonant member that can vibrate in a first mode of vibration, and a calibration electrode that is spaced from a capacitively coupled to the resonant member, the method comprises: applying a polarization voltage to the resonant member and a calibration voltage to the calibration electrode, wherein the polarization voltage is a negative voltage; vibrating the resonant member such that the resonant member vibrates in the first mode of vibration; measuring a frequency parameter of the resonant member; determining if the frequency parameter is in compliance with a predetermined threshold; and if the frequency parameter is not in compliance with the predetermined threshold, adjusting the frequency parameter to be in compliance with the predetermined threshold by adjusting at least one of the polarization voltage and the calibration voltage.

5 Claims, 10 Drawing Sheets

(58) Field of Classification Search
USPC ......................................................... 310/309
See application file for complete search history.

(56)                           References Cited

U.S. PATENT DOCUMENTS

| | | | |
|---|---|---|---|
| 9,162,875 | B2 * | 10/2015 | Durston .................. B81B 7/008 |
| 10,082,404 | B1 * | 9/2018 | Ge ........................ G01C 25/005 |
| 10,527,419 | B1 * | 1/2020 | Challoner .......... G01C 19/5684 |
| 2006/0037417 | A1 * | 2/2006 | Shcheglov ......... G01C 19/5684 |
| | | | 702/94 |
| 2007/0220971 | A1 * | 9/2007 | Ayazi ................. G01C 19/5698 |
| | | | 73/504.02 |
| 2011/0080198 | A1 * | 4/2011 | Ohta ..................... H02M 3/073 |
| | | | 327/157 |
| 2013/0283911 | A1 * | 10/2013 | Ayazi ..................... G01C 19/56 |
| | | | 73/504.12 |
| 2016/0139176 | A1 * | 5/2016 | Shirazi .............. G01C 19/5726 |
| | | | 73/1.38 |
| 2020/0309563 | A1 * | 10/2020 | Lipka ................. G01C 19/5698 |
| 2025/0150005 | A1 * | 5/2025 | Serrano ................. H02M 3/015 |

* cited by examiner

Calibration Voltage Vcal [V]

VP=15.0V (Curve 50)
VP=17.5V (Curve 52)
VP=20.0V (Curve 54)
VP=-5.0V (Curve 56)

$\Delta k_{cal}$

Calibration Voltage Vcal [V]

Feedback loop regulates Dickson pump input clock amplitude to control $V_{cp}$ voltage $V_{cp}=M*Vref+N*VDD$
(M, N are set by resistor ratio, $M=1-R1/R2$, $N=R1/R2$)

FIG. 7A

METHODS AND DEVICES FOR CALIBRATING CAPACITIVE RESONATORS

TECHNICAL FIELD

This application relates generally to capacitive resonators and more particularly, a methods and devices for calibrating capacitive resonators.

BACKGROUND ART

Conventional micro-electro-mechanical (MEMS) resonators are physical structures that are designed to vibrate, often at high frequencies. Such resonators may be incorporated into a variety of devices such as timing oscillators, mass sensors, gyroscopes, accelerometers, switches, and electromagnetic fuel sensors, amongst others. MEMS resonators play an essential role in a variety of applications, including mass sensing, timing reference applications, inertial sensing, and filtering applications.

SUMMARY OF INVENTION

Resonators typically include a resonant member that can vibrate in one or more modes. In applications, such as gyroscopic sensing, two modes are utilized—a drive mode and a sense mode. For example, drive mode vibration can correspond to linear vibration along a first axis, and sense mode vibration can correspond to linear vibration along a second axis that is substantially perpendicular to the first axis. A resonator can further include a plurality of drive electrodes that are spaced from and capacitively coupled to its resonant member. A voltage can be applied to one or more of the drive electrodes to excite the resonant member such that it vibrates in its drive mode at a certain frequency. If the resonant member is rotated, the Coriolis Effect will transfer energy from the drive mode to the sense mode and cause the resonant member to vibrate in the sense mode. It is generally desirable for the frequencies of the drive and sense modes to match, as this tends to increase signal-to-noise ratio of the resonator. However, the frequencies can vary from each other due to imperfections or other errors that occur during a fabrication process of the resonator. Therefore, it is desirable to calibrate the resonator after fabrication to compensate for these errors so that it can operate in a mode-matched condition.

BRIEF DESCRIPTION OF DRAWINGS

The foregoing and other aspects of the present invention will become apparent to those skilled in the art to which the present invention relates upon reading the following description with reference to the accompanying drawings, in which:

FIG. 7A illustrates one example embodiment of a charge pump of the regulated charge pump feedback loop;

DESCRIPTION OF EMBODIMENTS

Figure 1:
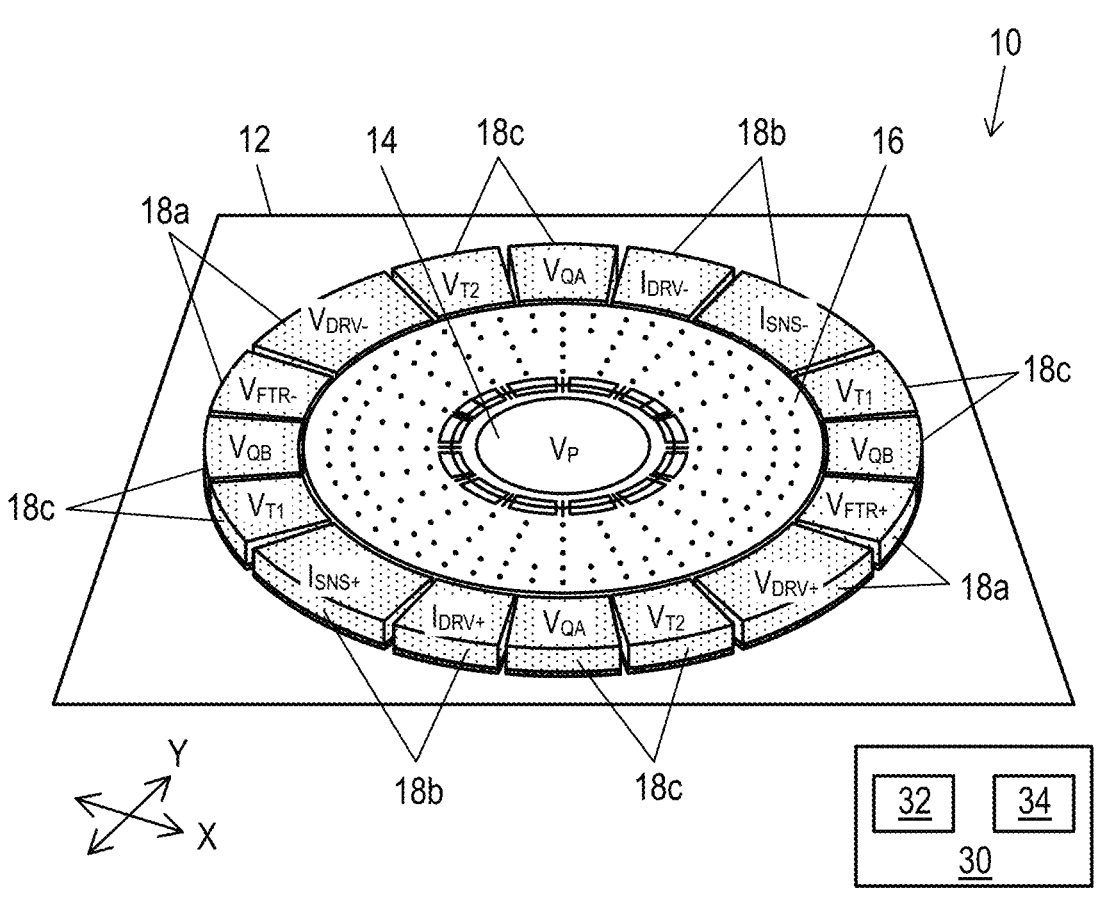
FIG. 1 is a schematic view of an example resonator and control system.

Example embodiments are described and illustrated in the drawings. These examples are not intended to be a limitation on the present invention. For example, one or more aspects can be utilized in other embodiments and even other types of devices. Moreover, certain terminology is used herein for convenience only and is not to be taken as a limitation.

Turning to FIG. 1, an example capacitively-transduced resonator 10 is illustrated that corresponds to a gyroscope sensor. The resonator 10 includes a substrate 12, a cylindrical anchor 14 that is fixed to the substrate 12, a resonant member 16 that is supported by the anchor 14 and extends radially outward from the anchor 14 such that it is suspended over the substrate 12, and a plurality of electrodes 18 that are spaced from and surround the resonant member 16. The electrodes 18 are capacitively coupled to the resonant member 16 and include a plurality of drive electrodes 18a, a plurality of sense electrodes 18b, and a plurality of calibration electrodes 18c.

The resonant member 16 is flexibly supported by the anchor 14 such that it can vibrate in two resonant modes—a first (e.g., drive) mode and a second (e.g., sense) mode. In the present example, drive mode vibration corresponds to radial vibration along a first axis X, and sense mode vibration corresponds to radial vibration along a second axis Y that is substantially perpendicular to the first axis X (e.g., so that the axes X, Y are within 10° or less of perpendicular, and preferably within about 5° or less of perpendicular). However, the drive and sense mode vibrations can correspond to other types and/or directions of vibrations in other examples. Indeed, the resonant member 16 may be vibrated in any number and type of one or more modes without departing from the scope of the disclosure.

Mode vibrations can be activated by applying a voltage to the resonant member 16 and/or one or more of the electrodes 18. For example, a voltage can be applied to one or more of the drive electrodes 18a, which in turn will excite the resonant member 16 and vibrate the resonant member 16 in the drive mode at its natural, drive-mode frequency. Similarly, a voltage can be applied to one or more of the sense electrodes 18b, which in turn will excite the resonant member 16 and vibrate the resonant member 16 in the sense mode at its natural, sense-mode frequency. Applying a voltage to the resonant member 16 and/or one or more of the calibration electrodes 18c can also induce or influence drive and/or sense mode vibrations.

In one example, the resonator 10 can be arranged in a first orientation (e.g., as shown in FIG. 1) and a driving voltage can be applied to one or more of the drive electrodes 18a, which in turn will apply a driving force to the resonant member 16 so as to excite the resonant member 16 and vibrate the resonant member 16 in the drive mode at its natural frequency. If the resonant member 16 is rotated to a different orientation, the Coriolis Effect will transfer energy from the drive mode to the sense mode and cause the resonant member 16 to vibrate in the sense mode. Moreover, the sense electrodes 18b are configured to generate a current in response to sense-mode movement of the resonant member 16. This current can be analyzed to determine a rotation rate of the resonant member 16.

It is to be appreciated that the resonator 10 described above can comprise alternative configurations without departing from the scope of this disclosure. Moreover, the resonator 10 can configured for other applications besides gyroscope sensing. For instance, the resonator 10 may be incorporated into a variety of devices such as timing oscillators, mass sensors, accelerometers, switches, and electromagnetic fuel sensors. Broadly speaking, the resonator 10 can comprise any configuration having a resonant member that can vibrate in one or more modes, and a plurality of electrodes that can be operated to vibrate the resonant member, wherein the electrodes include at least one drive electrode and at least one calibration electrode.

In gyroscopic sensing applications, it is generally desirable to vibrate the resonator 10 in two vibration modes (e.g., drive and sense modes) with matching frequencies of vibration, as this tends to increase signal-to-noise ratio of the resonator 10. However, the frequencies can vary from each other due to imperfections or other errors that occur during a fabrication process of the resonator 10. Therefore, in order to compensate for these errors, the resonator 10 can be calibrated after fabrication so that it operates in a mode-matched condition. To this end, the present inventors have developed new and useful methods and apparatus for calibrating the resonator 10 so that the frequencies of its drive and sense mode vibrations are substantially similar.

More specifically, a control system 30 can be provided that includes a programmable controller 32 operatively coupled to the resonant member 16 and electrodes 18 (e.g., via circuitry and wires). The control system 30 can further include one or more measurement devices configured to measure one or more parameters of the resonator 10 (e.g., voltage, current, frequency of vibrations in a particular mode, stiffness of a vibration mode, cross-stiffness of two vibration modes, etc.). For instance, the control system 30 in the present embodiment comprises a measurement device 34 (e.g., a network analyzer, lock-in amplifier, or part of an integrated circuit) configured to measure a frequency difference between sense mode and drive mode vibrations of the resonant member 16. Each measurement device can be operatively coupled to the controller 32 in order to communicate its measured parameter(s) to the controller 32. Moreover, each measurement device can be operatively coupled to the resonant member 16 and/or electrodes 18 as necessary to measure its respective parameter(s).

The controller 32 can be programmed to perform a calibration process that adjusts a frequency parameter of the resonator 10, preferably such that it operates in a mode-matched condition. During this process, the controller 32 can initially operate the resonator 10 so that the resonant member 16 vibrates in both modes of vibration. For example, the controller 32 can apply a voltage to one or more of the drive electrodes 18a such that the resonant member 16 vibrates in the drive mode, and apply a separate voltage to one or more of the sense electrodes 18b such that the resonant member 16 vibrates in the sense mode. The controller 32 can further apply a polarization voltage $V_p$ to the resonant member 16 and a calibration voltage $V_{cal}$ to one or more of the calibration electrodes 18c.

While the resonant member 16 is vibrating in both modes and the polarization and calibration voltages $V_p$, $V_{cal}$ are being applied to the resonator 10, the controller 32 can determine a frequency parameter $f_p$ of the resonant member

16 (for the purposes of this disclosure, a "frequency parameter" of a resonant member refers to a frequency of one of the two modes of vibration, the frequencies of both modes of vibration, a frequency difference between the two frequencies, or any other parameter or group of parameters that is or are indicative of said frequency, frequencies, or frequency difference). For example, the controller 32 in the present embodiment will operate the measurement device 34, which will measure the frequency difference between the resonant member's two modes of vibrations and send an output to the controller 34 indicating that frequency difference. In other examples, the controller 32 can operate separate measurement devices that each measure the frequency of a respective vibration mode and provide an output to the controller 32 indicating that frequency. The controller 32 can then calculate the frequency difference between the two vibration modes.

The controller 32 can then determine if the frequency parameter $f_p$ is in compliance with a predetermined threshold. For instance, the controller 32 in the present embodiment will determine if the frequency difference between the two vibration modes is equal to or below a predetermined maximum threshold. The maximum threshold can be a fixed value (e.g., 0.1 Hz) or the maximum threshold can be a function of some other variable (e.g., 0.1 ppm of the frequency of drive mode vibrations). In other examples, if the frequency parameter $f_p$ corresponds to the frequencies of the two vibration modes, the controller 32 can determine if a ratio of the two frequencies is within a predetermined threshold range (e.g., 0.8 to 1.2).

If the frequency parameter $f_p$ is not in compliance with the predetermined threshold, the controller 32 can adjust one or more calibration parameters of the resonator 10 so that the frequency parameter $f_p$ becomes compliant with the predetermined threshold (for the purposes of this disclosure, a "calibration parameter" of a resonator refers to any parameter of the resonator that can be adjusted to influence the frequency parameter $f_p$). For example, one calibration parameter of the resonator 10 can be stiffness of the drive mode $k_d$, which can change based on certain parameters as follows:

$$\Delta k_d = \chi \left[ V_p^2 - (V_p - V_{cal})^2 \right], \qquad \text{[Math 1]}$$

where $\Delta k_d$ is the change in stiffness $k_d$ of the drive mode, $\chi$ is a proportionality constant of the resonant member 16, $V_p$ is the polarization voltage applied to the resonant member 16, and $V_{cal}$ is the calibration voltage applied to one of the calibration electrodes 18c.

Figure 2:
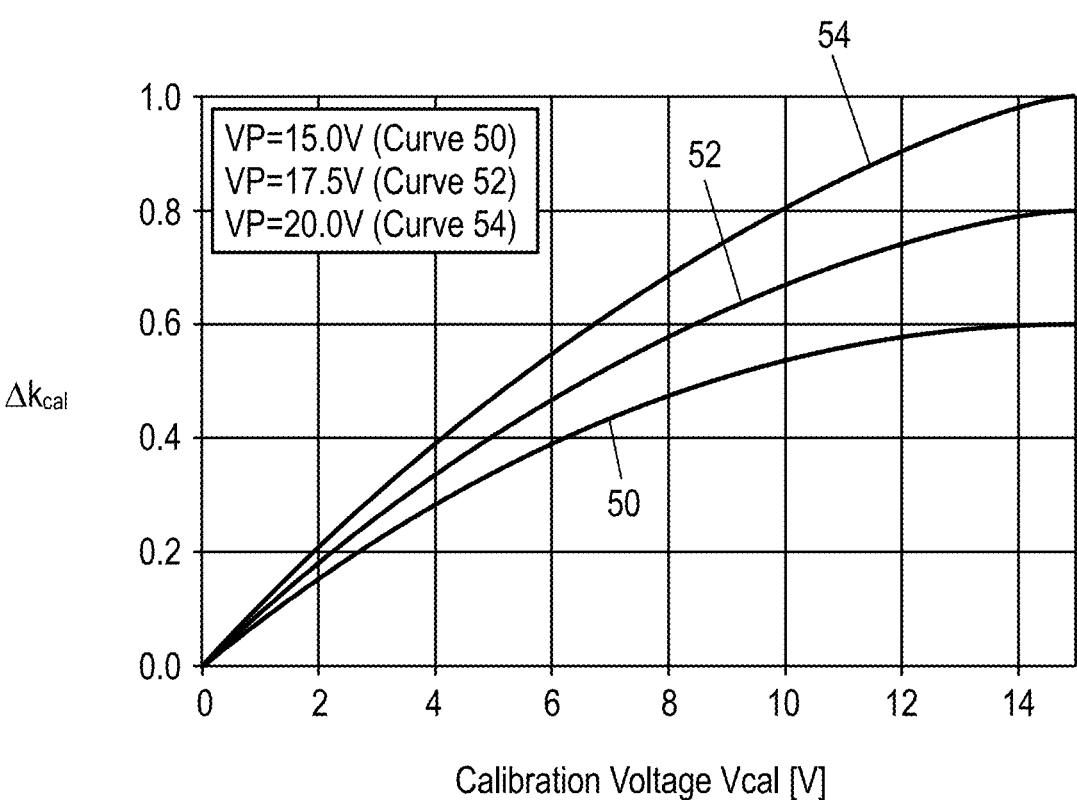
FIG. 2 is a graph showing how a change in stiffness of the resonator can vary as a function of polarization voltage and calibration voltage.

FIG. 2 shows how the change in stiffness $\Delta k_d$ can vary as a function of the polarization voltage $V_p$ and calibration voltage $V_{cal}$. In particular, curve 50 shows how the change in stiffness $\Delta k_d$ can vary when the polarization voltage $V_p$ is set to 15.0 volts and the calibration voltage $V_{cal}$ is increased from zero to 15 volts; curve 52 shows how the change in stiffness $\Delta k_{cal}$ can vary when the polarization voltage $V_p$ is set to 17.5 volts and the calibration voltage $V_{cal}$ is increased from zero to 15 volts; and curve 54 shows how the change in stiffness $\Delta k_d$ can vary when the polarization voltage $V_p$ is set to 20 volts and the calibration voltage $V_{cal}$ is increased from zero to volts. The y-axis values have been normalized so that the largest stiffness change $\Delta k_d$ is 1 and the smallest stiffness change $\Delta k_d$ is zero. The stiffness $k_d$ and how much it changes are therefore a function of the polarization voltage $V_p$ and calibration voltage $V_{cal}$, and can be modified by adjusting those voltages. Moreover, adjusting the stiffness $k_d$ can in turn modify the frequency parameter $f_p$ of the resonant member 16.

It is to be appreciated that the polarization voltage $V_p$ and calibration voltage $V_{cal}$ can similarly influence other calibration parameters that affect the frequency parameter $f_p$ of the resonant member 16. For instance, depending on the location of the calibration electrode 18c in which the calibration voltage $V_{cal}$ is applied, the polarization voltage $V_p$ and calibration voltage $V_{cal}$ can similarly influence stiffness of the sense mode, or cross-stiffness of the drive and sense modes, which can also affect the frequency parameter $f_p$ of the resonant member 16.

In this manner, the controller 32 can adjust one or both of the polarization voltage $V_p$ and calibration voltage $V_{cal}$ to adjust one or more calibration parameters of the resonator 10 so that frequency parameter $f_p$ becomes compliant with the predetermined threshold. Moreover, it is to be appreciated that the controller 32 can also adjust one or more other voltages or other parameters during this process to influence the frequency parameter $f_p$ so that it becomes compliant with the predetermined threshold. Broadly speaking, the controller 32 can be programmed to perform any number and/or series of adjustments that includes adjusting one or both of the polarization voltage $V_p$ and calibration voltage $V_{cal}$ so that the frequency parameter $f_p$ becomes compliant with the predetermined threshold.

Preferably, the calibration process described above will result in the drive and sense mode frequencies being substantially equal to each other (for the purposes of this disclosure, two frequencies are "substantially equal" if a ratio of the frequencies is between 0.8 and 1.2). In some examples, the calibration process will result in the drive and sense mode frequencies being closer to each other by some predetermined threshold. For example, a frequency difference between the drive and sense mode frequencies after calibration can be about 1% or less than a frequency difference between the drive and sense mode frequencies before calibration.

It is to be appreciated that the controller 32 in some examples can be programmed to adjust multiple calibration parameters and/or frequency parameters $f_p$ to ultimately calibrate the drive and sense mode frequencies. Moreover, it is to be appreciated that the calibration process in some examples may be designed to result in a greater frequency difference between the drive and sense mode frequencies. Still further, in embodiments having a single mode of vibration, the controller 32 can adjust one or more calibration parameters to adjust a frequency of that single mode to a comply with a predetermined threshold. Broadly speaking, the controller 32 can be programmed to perform any calibration process wherein at least one of the polarization voltage $V_p$ and calibration voltage Veal is modified to adjust one or more frequency parameters $f_p$ to render them in compliance with one or more predetermined thresholds.

Referring back to FIG. 2, an improvement on the above calibration process will now be described. As can be seen in the figure, the change in stiffness $\Delta k_{cal}$ for each curve 50, 52, 54 initially increases with calibration voltage $V_{cal}$ but eventually levels off such that larger calibration voltages $V_{cal}$ have less and less impact on the stiffness change $\Delta k_{cal}$. Thus, the range in which the stiffness $k_{cal}$ can be adjusted by increasing calibration voltage $V_{cal}$ is limited in this regard. Furthermore, although the range can be amplified by raising polarization voltage $V_p$ (e.g., from 15 to 20 volts), higher polarization voltages Veal are generally undesirable as they increase noise and power consumption of the resonator 10.

It is generally ideal to maximize stiffness change $\Delta k_d$ in response to calibration voltage $V_{cal}$, so that greater ranges of adjustments can be made to the stiffness $k_{cal}$ for the purposes of calibrating the resonator 10. Moreover, it also ideal to minimize polarization and calibration voltages $V_p$, $V_{cal}$ to reduce noise and power consumption of the resonator 10. However, as can be seen in FIG. 2, these objectives are typically in conflict with each other, since stiffness change $\Delta k_{cal}$ is typically lower with smaller polarization and calibration voltages $V_p$, $V_{cal}$.

Figure 3:
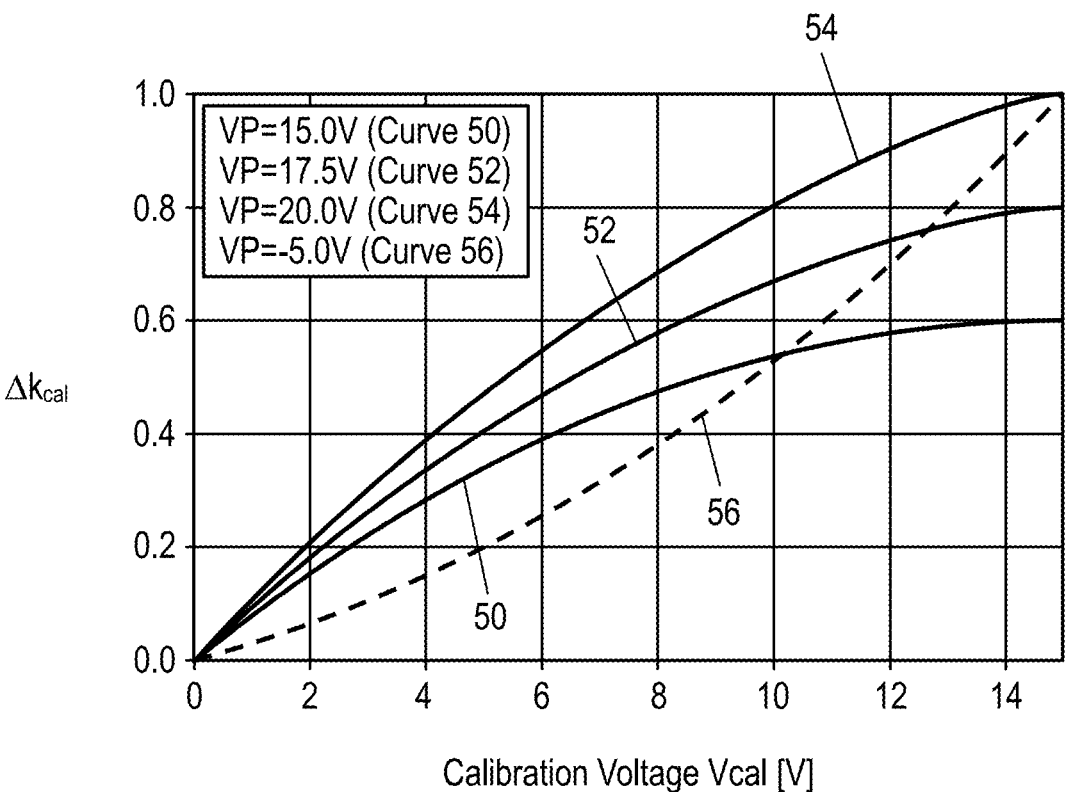
FIG. 3 is another graph showing how the change in stiffness of the resonator can vary as a function of polarization voltage and calibration voltage.

The present inventors have found that by applying a negative polarization voltage $V_p$ to the resonant member 16, stiffness change $\Delta k_{cal}$ can be maximized while also minimizing polarization and calibration voltages $V_p$, $V_{cal}$. More specifically, FIG. 3 shows the same curves 50, 52, 54 in FIG. 2 but further includes a curve 56 showing how the change in stiffness $\Delta k_{cal}$ can vary when the polarization voltage $V_p$ is set to −5.0 volts and the calibration voltage $V_{cal}$ is increased from zero. The y-axis values are again normalized so that the largest change in stiffness $\Delta k_{cal}$ is 1 and the smallest change in stiffness $\Delta k_{cal}$ is zero.

As can be seen in FIG. 3, the slope of the curves 50, 52, 54 flattens as calibration voltage $V_{cal}$ increases. This means that the efficiency of calibration reduces as larger calibration voltages $V_{cal}$ are required. Conversely, the slope of curve 56 gets steeper as calibration voltage $V_{cal}$ increases, which means the efficiency of calibration is better when a negative polarization voltage $V_p$ is utilized. In other words, the change in stiffness $\Delta k_{cal}$ can be increased by increasing calibration voltage $V_{cal}$, and will not be limited as calibration voltage $V_{cal}$ continues to rise. Furthermore, similar or greater values of the change in stiffness $\Delta k_{cal}$ can be realized at a particular calibration voltage $V_{cal}$ for curve 56 as compared to curves 50, 52, 54, but with a much lower absolute value of polarization voltage $V_p$. Indeed, the change in stiffness $\Delta k_{cal}$ will be much greater for curve 56 as compared to curves 50, 52, 54 for calibration voltages $V_{cal}$ beyond that illustrated in FIG. 3.

Figure 4:
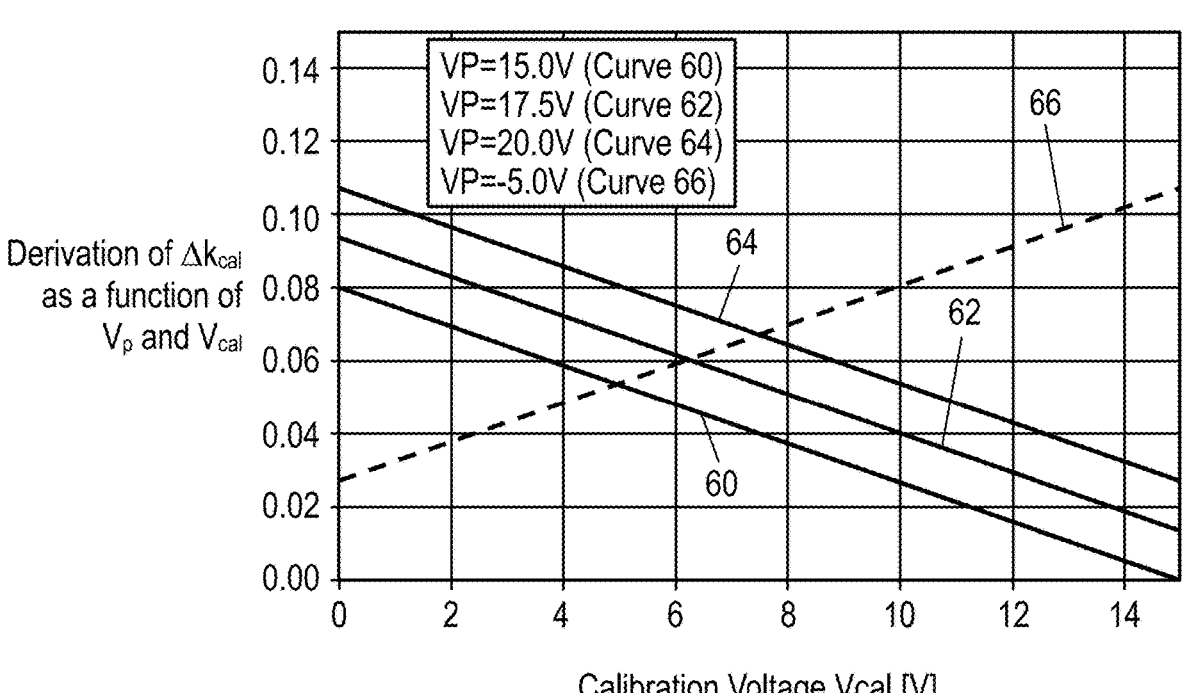
FIG. 4 is a graph showing the slopes/derivatives of the curves in FIG. 3.

The above effects can be similarly visualized by observing FIG. 4, which shows lines 60, 62, 64, 66 that respectively correspond to the slope/derivative of curves 50, 52, 54, 56 in FIG. 3 over calibration voltage $V_{cal}$.

Thus, by applying a negative polarization voltage $V_p$ to the resonant member 16, the stiffness change $\Delta k_d$ in response to calibration voltage $V_{cal}$ can be maximized while also minimizing polarization and calibration voltages $V_p$, $V_{cal}$, thereby maximizing calibration efficiency while minimizing noise and power consumption. Moreover, it is to be appreciated that similar effects can be realized on other calibration parameters such as, for example, stiffness of the sense mode or cross-stiffness of the two modes, which are similarly a function of polarization and calibration voltages $V_p$, $V_{cal}$. That is, by applying a negative polarization voltage $V_p$ to the resonant member 16, the change of those calibration parameters in response to calibration voltage $V_{cal}$ can be maximized while also minimizing polarization and calibration voltages $V_p$, $V_{cal}$.

Figure 5:
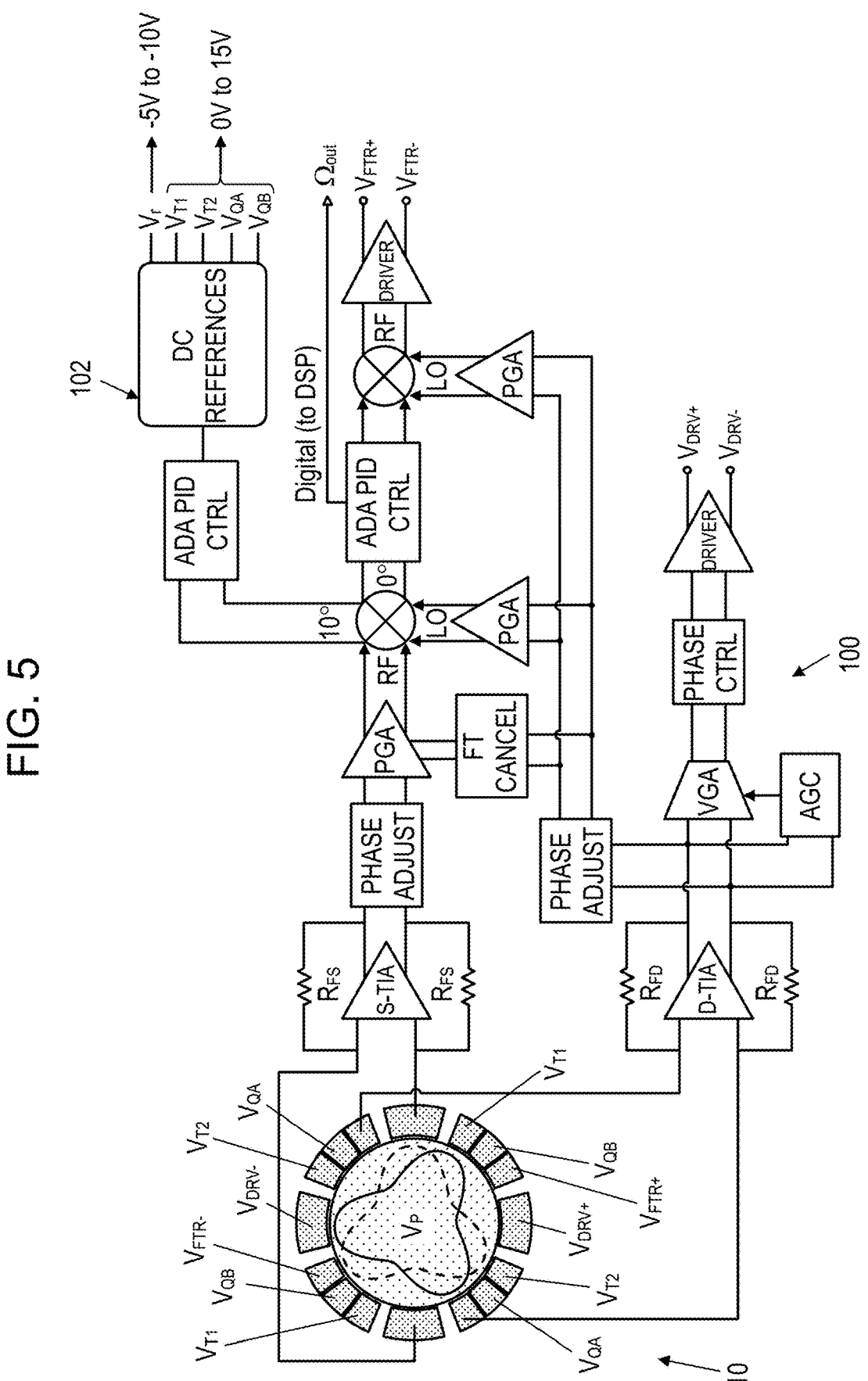
FIG. 5 depicts an example circuit for the control system of the resonator.

Turning to FIG. 5, an example circuit 100 will now be described that can enable the controller 32 to apply a negative polarization voltage $V_p$ to the resonant member 16. The circuit 100 can be the controller 32 itself, or the circuit 100 can be operatively coupled between the controller 32 and resonant member 16. The circuit 100 can include a DC References circuit portion 102 that is configured to generate the polarization voltage $V_p$ and calibration voltages $V_{T1}$, $V_{T2}$, $V_{QA}$, $V_{QB}$ for respective calibration electrodes 18c.

In some examples, a positive programmable charge pump circuit may be configured to generate the calibration voltages $V_{T1}$, $V_{T2}$, $V_{QA}$ and $V_{QB}$, whereas a negative charge pump circuit may be configured to generate the polarization voltage $V_p$, all from a standard supply voltage of, for example, at most 3 V. The polarization voltage $V_p$ and the calibration voltages $V_{T1}$, $V_{T2}$, $V_{QA}$ and $V_{QB}$ may be generated by the circuit 102, and the outputs from the circuit 102 may be connected to, for example, any number of electrodes 18 of the resonator 10 (implicit connection wires are not illustrated). Without limitation, and by way of example, the polarization voltage $V_p$ may be controlled to provide a negative value in the range of −2.0 volts to −10.0 volts, and the calibration voltages $V_{T1}$, $V_{T2}$, $V_{QA}$ and $V_{QB}$ may be each configured to provide a voltage value in the range of 0 volts to 15.0 volts.

The circuit 102 may include a negative charge pump circuit, as further described below. Unlike a positive charge pump operation, a reversed bias scheme is implemented via a negative charge pump circuit by reversing the diodes such that they can only turn on if voltage is larger than the previous voltage. In this manner, the diode may be configured to turn on when the capacitor stores charge or voltage in the opposite direction. Thus, the negative charge pump circuit may be configured to implement the reverse bias and include a plurality of stages that enable pumping down the voltage to a desired negative value to achieve the negative polarization voltage $V_p$. This biasing scheme prevents the transistors from operating in an undesirable manner.

Figure 6:
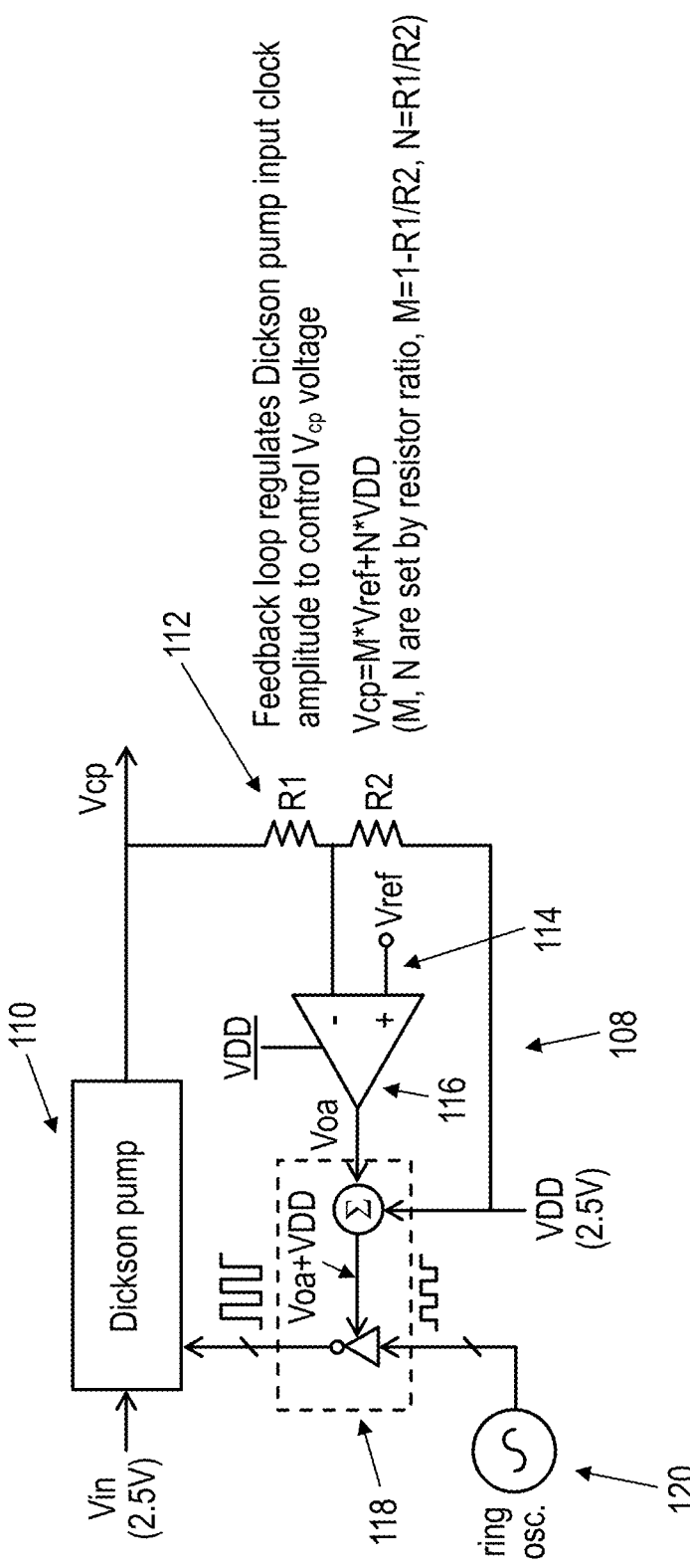
FIG. 6 illustrates a regulated charge pump feedback loop of the circuit.

FIG. 6 illustrates a regulated charge pump feedback loop circuit 108 that is a part of the circuit 102 in FIG. 5. The circuit 108 may include a charge pump 110, a resistor divider 112 for negative feedback in the regulation loop, a reference voltage generator 114, a feedback loop error amplifier 116, a clock generator circuit 118, and a ring oscillator circuit 120.

The charge pump 110 may be configured to multiply an input voltage $V_{in}$ (e.g., 2.5 volts DC) to produce an output voltage $V_{cp}$ by using its input clock to charge circuit elements, including but not limited to one or more capacitors C1, C2, C3, within the charge pump 110 and also transfer the charge from the output to the input (reverse of a positive charge pump, where the charge transfers to the output from the input) The output voltage $V_{cp}$ corresponds to the polarization voltage $V_p$ described above, and thus can be applied to the resonant member 16 for calibration. The voltage $V_{cp}$ is defined by variables M and N, which are a function of resistor ratio, where $M=1-R_1/R_2$, and $N=R_1/R_2$. Without feedback, the charge pump 110 may be configured to pump the output voltage $V_{cp}$ without regulation up to a large voltage level that may depend on the number of stages within the charge pump 110, clock amplitude, clock frequency, and other internal losses.

The feedback loop may be configured to regulate the output voltage $V_{cp}$ by feeding a divided down version of $V_{cp}$ via the resistor divider 112 to the error amplifier 116. The error amplifier 116 may be configured to compare this voltage to a reference voltage $V_{ref}$ that is produced by the generator 114. As further depicted in FIG. 6, the output of the error amplifier 116 may be configured to drive the clock generator circuit 118 to control the amplitude of clocks in the charge pump 110. The frequency of the clocks may include a fixed frequency derived by the ring oscillator circuit 120.

Figure 7A:
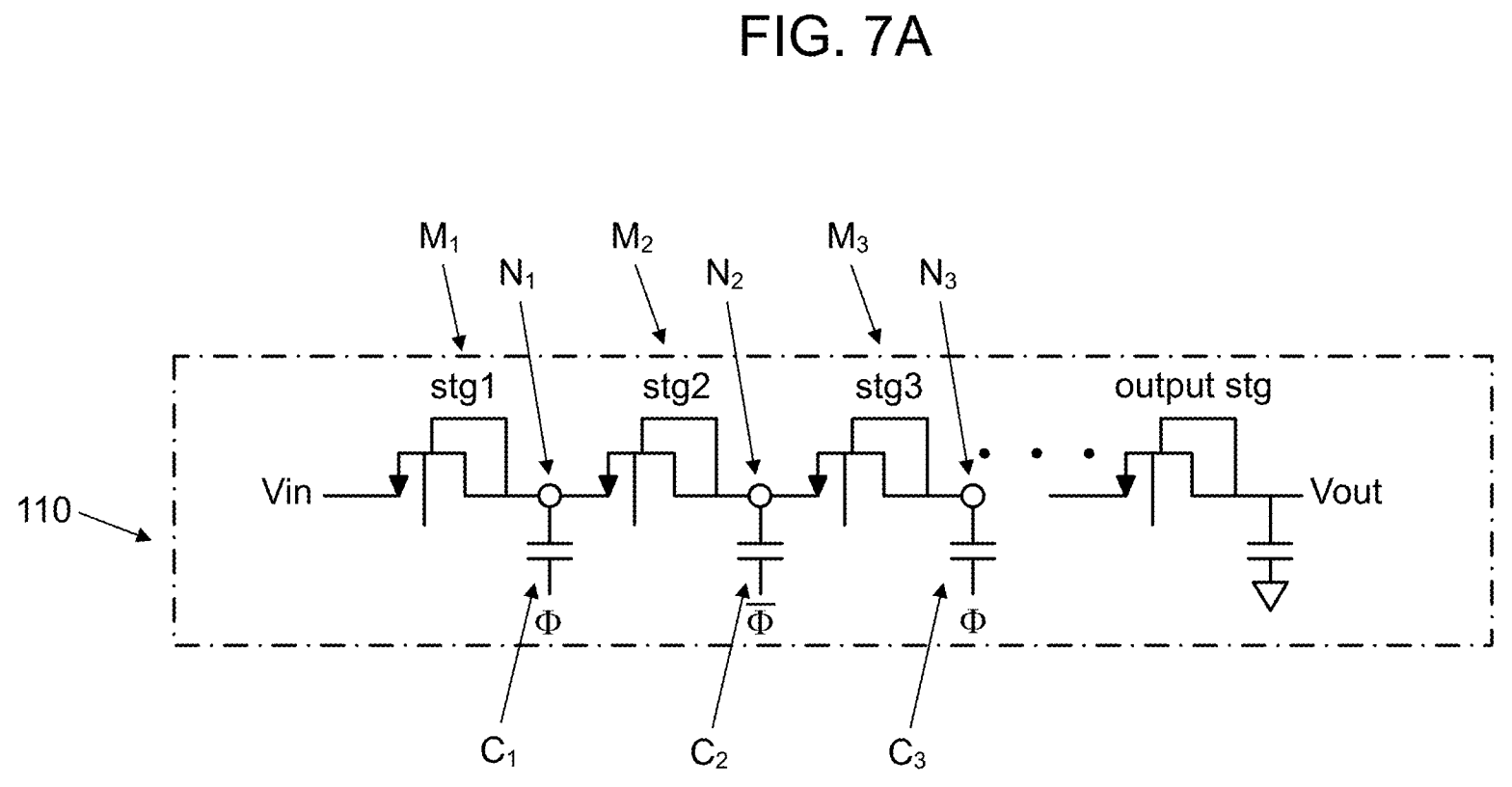

As illustrated in FIG. 7A, the charge pump 110 may be formed by a cascaded connection of transistors $M_1$, $M_2$, $M_3$, . . . , Mn, such as NMOS transistors, whose bridging nodes $N_1$, $N_2$, $N_3$, . . . $N_n$ may be connected to associated capacitors $C_1$, $C_2$, $C_3$, . . . $C_n$ in any number of stages, such as stg 1, stg 2, stg 3, . . . stg n, and output stg. The charge pump 110 may comprise a plurality of clocks $\Phi_{1-n}$ as respective inputs to the capacitors $C_{1-n}$. Moreover, the connections on NMOS transistors of the charge pump 110 are reversed. To achieve the reverse bias, this connection reversal of transistors $M_1$, $M_2$, $M_3$, . . . , Mn may be implemented for all stages in the charge pump 110 so that instead of charging the capacitors $C_{1-n}$ and transferring the charge to the output voltage $V_{out}$, the charge flow is transferred in the opposite direction. In this manner, this change in connection reverses the diode connection. Thus, the current flow is thereby reversed.

The capacitors $C_{1-n}$ may be alternately driven by the clocks $\Phi$ or an inverse polarity of the clock. By way of example, capacitor $C_1$ may be driven by the clock $\Phi_1$, capacitor $C_2$ may be driven by $\Phi_2$, which has the inverse polarity of the clock $\Phi_1$, and so on, so that they are pumped in opposite directions to sequentially transfer charge down the path from input to output of the charge pump 110. By way of example, the inverse polarity of a clock $\Phi$ may be derived by pushing the clock $\Phi$ through an inverter (not shown). The final stage, or output stg, may comprise a rectifier stage that only conducts for half of the clock cycle, which converts the previous stages' output from a clock waveform to a DC voltage.

Figure 7B:
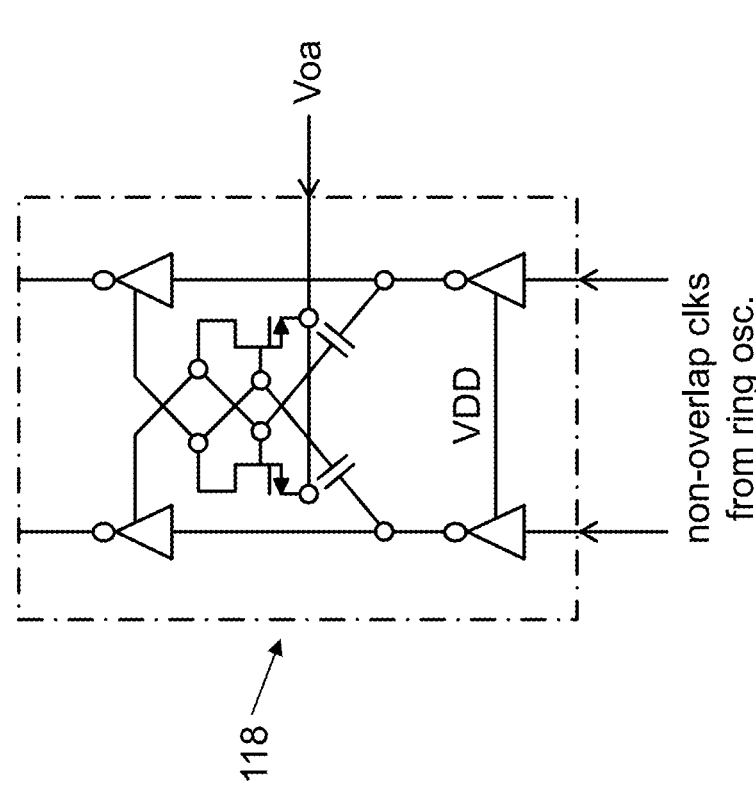
FIG. 7B illustrates a clock generator circuit of the regulated charge pump feedback loop.

As illustrated in FIG. 7B, the clock generator circuit 118 may comprise a voltage doubler circuit utilizing flying capacitors. For this charge pump application, the clock generator circuit 118 may be configured to accept a voltage $V_{oa}$ that controls output clock amplitudes of the clock generator circuit 118. Additionally, the input and output clocks of the clock generator circuit 118 may include non-overlapping clocks to avoid simultaneously turning on all stages in the charge pump 110 at once and creating reverse current leakage. In particular, the incoming voltage $V_{oa}$ (from an operational amplifier, or the error amplifier 116) may be configured to control the output clock of the clock generator circuit 118. The amplitude of the output clock is the same as the amplitude of the input clock summed with voltage $V_{oa}$.

The resistor divider 112 is connected between $V_{DD}$) and an output of the charge pump 110, and includes a first resistor $R_1$ in series with a second resistor $R_2$. By way of example, the sum of values of the first resistor $R_1$ and the second resistor $R_2$ are designed to ensure that they do not draw too much current, and in some cases, the sum of values may exceed 9 MΩ. However, such large resistors may create a feedback loop stability problem because of a low frequency pole formed by the first resistor $R_1$, the second resistor $R_2$, and an input capacitance of the operational amplifier, such as error amplifier 116. To resolve the feedback loop stability problem, a capacitor may be included to generate a zero in a loop transfer function and restore adequate phase margin in the feedback loop. For example, the capacitor may be added in parallel with a portion of the first resistor $R_1$. Moreover, an input of the error amplifier 116 is connected to a node between the first and second resistors $R_1$, $R_2$. As a consequence of the resistor divider 112, a voltage at that node (which is a fraction of $V_{cp}$) is supplied to the error amplifier 116, which compares it to a reference voltage $V_{ref}$ and amplifies the difference, that amplified difference ($V_{oa}$) representing the output of the operational amplifier 116 that drives the clock generator circuit 118. In this manner, the charge pump 110 may be configured to pump up or pump down to regulate the voltage $V_{cp}$ to a multiplier of the reference voltage $V_{ref}$. The connection to $V_{DD}$ (via path including $R_2$) is for the negative charge pump.

Figure 8:
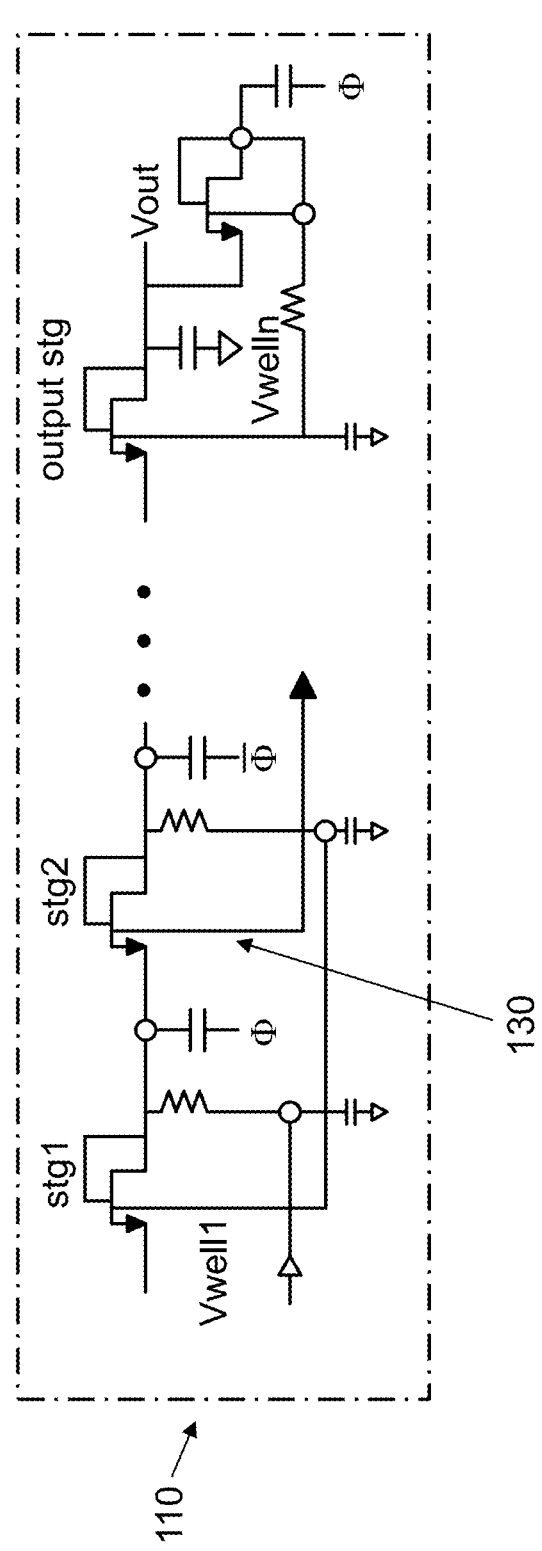
FIG. 8 illustrates another example embodiment of the charge pump of the regulated charge pump feedback loop.

FIG. 8 illustrates another example embodiment of the charge pump 110. As depicted in FIG. 8, well biasing connections in the stages of the charge pump 110 are provided. The output of each stage (such as stg 1) of the charge pump 110, which is a clock waveform, may be regulated by a filter, such as an RC filter, to generate a DC bias voltage that is connected to a local p-well (not shown but see FIG. 9 as described below). The RC filter may be connected to an output of a next stage (such as stg 2). In some examples, the output of each stage need not be filtered by the RC filter. Since the last stage is lossy (DC drop from its input to output producing dissipation), an additional parallel pump stage may be added to generate a voltage Vwell because the same Vwell bias voltage generation method may create leakage current since it turns on a parasitic PWELL_N+ diode. As further depicted in FIG. 8, a bulk, or local p-well, node 130 may be connected to an output side of a following stage.

Figure 9:
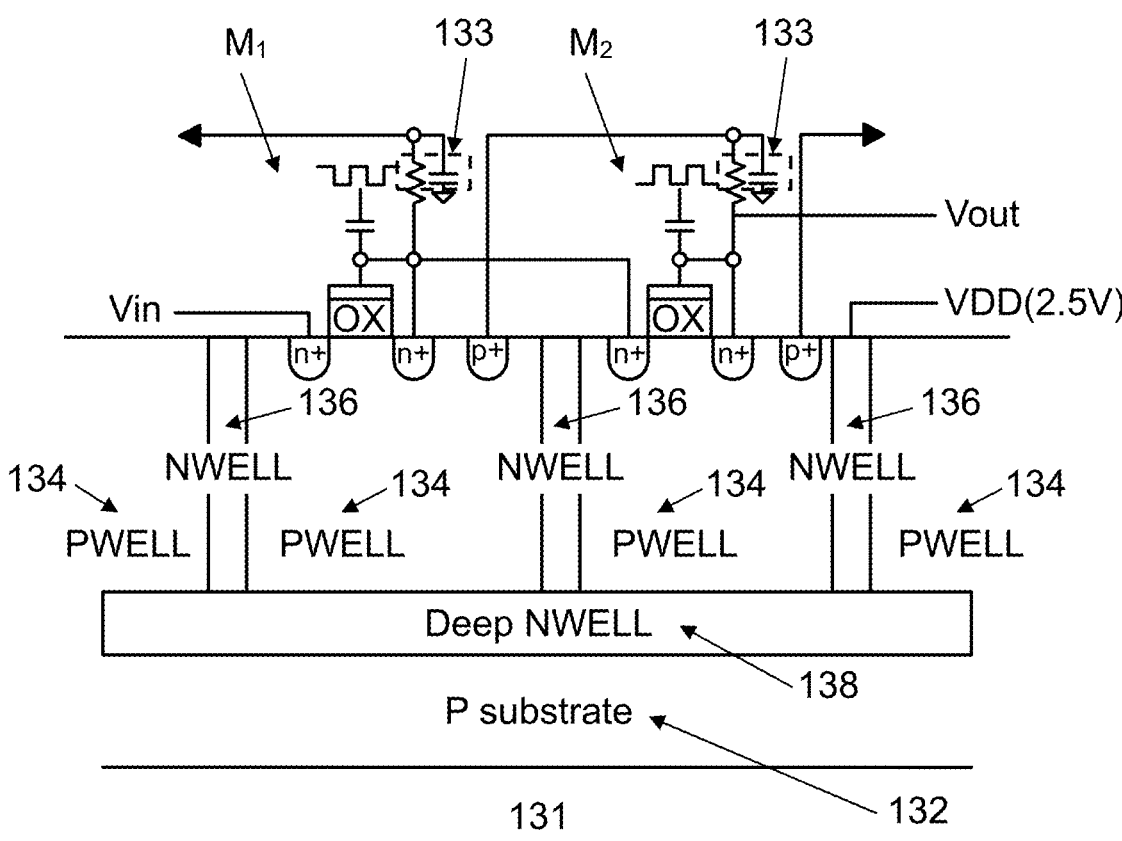
FIG. 9 illustrates a cross-sectional view of an integrated circuit for the regulated charge pump feedback loop.

FIG. 9 illustrates a cross-sectional view of an example integrated circuit 131 for the regulated charge pump feedback loop circuit 108. The integrated circuit 131 forms two cascaded pump stages of the charge pump 110. It is understood that any number of additional stages each including a transistor may be added. The depicted illustration of FIG. 9 allows for implementation of negative voltage levels relative to a grounded application specific integrated circuit (ASIC) substrate and includes utilization of a triple-well to create isolated wells that are biased.

In particular, the integrated circuit 131 may include a semiconductor chip having a P substrate 132 and two p-wells 134 that are formed in the P substrate 132 and isolated therefrom by a plurality of n-wells 136 and a deep n-well layer 138. Each transistor $M_1$, $M_2$ of integrated circuit 131 may include bulk, source, gate, and drain regions formed in p-well 134. The p-wells 134 are biased below ground, and the deep n-well layer 138 is biased above ground, such as 2.5 volts. The deep n-well layer 138 may be disposed so as to isolate each p-well 134 from the P substrate 132. In this manner, the p-wells 134 may be biased to a different DC voltage than the P substrate 132 because the deep n-well layer 138, and the p-wells 134 may be biased to negative voltages. Without limitation, and by way of example, the p-wells 134 may be biased up to −11.0 volts. The deep n-well layer 138 may be configured to be biased to the highest positive voltage, such as 2.5 volts, to ensure that the p-well 134 to n-well 136 and the substrate 132 to n-well 136 transistors do not conduct current via connection through the n-wells 136.

Each stage's voltage is subjected to an RC filter 133 to bias its p-well 134, which keeps the oxide voltage less than the maximum allowable technology voltage for the NMOS transistors $M_1$, $M_2$ so as to avoid stressing the oxide layer deposited on the p-well 134. For each stage, such bias circuits depicted in FIG. 9 may be configured to generate DC voltage for that stage's p-well 134. For example, the RC filter 133 may be connected to an output of a next stage.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

While certain implementations of the disclosed technology have been described above, it is to be understood that the disclosed technology is not to be limited to the disclosed implementations, but on the contrary, is intended to cover various modifications and equivalent arrangements included within the scope of the appended claims. The patentable scope of certain implementations of the disclosed technology is defined in the claims, and may include other examples that occur to those skilled in the art.

The invention claimed is:

1. A method of calibrating a resonator having a resonant member that can vibrate in a first mode of vibration, and a calibration electrode that is spaced from, and capacitively coupled to the resonant member, the method comprising:
applying a polarization voltage to the resonant member and a calibration voltage to the calibration electrode, wherein the polarization voltage is a negative voltage;
vibrating the resonant member such that the resonant member vibrates in the first mode of vibration;
measuring a frequency parameter of the resonant member;
determining if the frequency parameter is in compliance with a predetermined threshold; and
if the frequency parameter is not in compliance with the predetermined threshold, adjusting the frequency parameter to be in compliance with the predetermined threshold by adjusting at least one of the polarization voltage and the calibration voltage.

2. The method according to claim 1, wherein the frequency parameter corresponds to a first frequency of the first mode of vibration.

3. The method according to claim 1, wherein the resonant member also vibrates in a second mode of vibration, and the frequency parameter corresponds to a difference between a first frequency of the first mode of vibration and a second frequency of the second mode of vibration.

4. A resonator system comprising:
a resonant member that can vibrate in a first mode and a second mode;
a plurality of electrodes that are spaced from and capacitively coupled to the resonant member, the plurality of electrodes including a calibration electrode, a drive electrode, and a sense electrode; and
a controller operatively coupled to the resonant member and plurality of electrodes, the controller being configured to:
apply a polarization voltage to the resonant member and a calibration voltage to the calibration electrode, wherein the polarization voltage is a negative voltage,
vibrate the resonant member such that the resonant member vibrates in the first mode of vibration and the second mode of vibration,
determine if a frequency parameter of the resonant member is in compliance with a predetermined threshold, and
if the frequency parameter is not in compliance with the predetermined threshold, adjust the frequency parameter to be in compliance with the predetermined threshold by adjusting at least one of the polarization voltage and the calibration voltage.

5. An integrated circuit comprising:
a negative charge pump configured to output an output voltage, the negative charge pump including a plurality of reverse biased transistors;
a divider configured to divide a portion of the output voltage to generate an input voltage;

an amplifier configured to compare the input voltage with
a reference voltage; and
clock circuitry configured to control clock amplitude
supplied to the negative charge pump.

\* \* \* \* \*